United States Patent
Montuno et al.

(10) Patent No.: US 7,298,699 B1
(45) Date of Patent: Nov. 20, 2007

(54) RATE-BASED INTEGRAL CONTROL SCHEME FOR ACTIVE QUEUE MANAGEMENT

(75) Inventors: Delfin Montuno, Kanata (CA); James Aweya, Kanata (CA); Michel Ouellette, Plantagenet (CA); Kent Felske, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 982 days.

(21) Appl. No.: 10/426,289

(22) Filed: Apr. 30, 2003

(51) Int. Cl.
 *H04L 12/26* (2006.01)
(52) U.S. Cl. .................................................. 370/232
(58) Field of Classification Search ................ 370/231, 370/232, 236
 See application file for complete search history.

(56) References Cited

U.S. PATENT DOCUMENTS

| | | | |
|---|---|---|---|
| 6,690,645 B1 * | 2/2004 | Aweya et al. ............... | 370/230 |
| 6,788,697 B1 * | 9/2004 | Aweya et al. ............... | 370/412 |
| 2002/0105908 A1 * | 8/2002 | Blumer et al. .............. | 370/230 |
| 2003/0067878 A1 * | 4/2003 | Zboril ........................ | 370/235 |

OTHER PUBLICATIONS

Aweya, J. et al., "A Control Theoretic Approach to Active Queue Management," *Computer Networks*, vol. 36, Issue 2-3, Jul. 2001, pp. 203-235.
Braden, D. et al., "Recommendation on Queue Management and Congestion Avoidance in the Internet," *IETF RFC 2309*, Apr. 1998.
Chait, Y et al., "Fixed and Adaptive Model-Based Controllers for Active Queue Management," *Proc. American Control Conf.*, Arlington, VA, Jun. 25-27, 2001, pp. 2981-2986.
Cnodder, S.D. et al. "A Rate Based Red Mechanism," *Proc. NOSSDAV 2000*, Chapel Hill, North Carolina, Jun. 26-28, 2000, pp. 602-609.
Feng, W. et al., "A Self-Configuring RED," *Proc. IEEE INFOCOM'99*, 1999, pp. 1320-1328.
Feng, W. et al., "BLUE: A New Class of Active Queue Management Algorithms", *Technical Report* CSE-TR-387-99, Dept. of EECS, University of Michigan, Apr. 1999.
Floyd, S. et al., "Random Early Detection Gateway for Congestion Avoidance," *IEEE/ACM Trans. Networking*, vol. 1, No. 4, Aug. 1993, pp. 397-413.
Hollot, C.V. et al., "A Control Theoretic Analysis of RED," *Proc. IEEE INFOCOM 2001*, 2001, pp. 1510-1519.
Hollot, C.V. et al., "On Designing Improved Controllers for AQM Routers Supporting TCP Flows," *Proc. IEEE INFOCOM 2001*, 2001, pp. 1726-1734.

(Continued)

*Primary Examiner*—Doris H. To
*Assistant Examiner*—Kerri M Rose
(74) *Attorney, Agent, or Firm*—Ridout & Maybee LLP

(57) ABSTRACT

Disclosed is an Active Queue Management method and apparatus which uses traffic rate information for congestion control. Using a nonlinear fluid-flow model of Traffic Control Protocol, an integral controller in a closed loop configuration with gain settings characterized for stable operation allows a matching of the aggregate rate of the active TCP connections to the available capacity. Further disclosed is a method for calculation of the regime of gains for which stable operation of a given network obtains. This approach allows for capacity matching while maintaining minimal queue size and high link utilization.

15 Claims, 10 Drawing Sheets

OTHER PUBLICATIONS

Kharitonov, V.L. et al., "Robust Stability of Time-delay Systems," *IEEE Trans. Automatic Control*, vol. 39, No. 12, Dec. 1994, pp. 2388-2397.

Kunniyur, S. et al., "End-to-end Congestion Control: Utility Functions, Random Losses and ECN Marks," *Proc. IEEE INFOCOM'2000*, Tel Aviv, Israel, Mar. 2000, pp. 1323-1332.

Misra, V. et al. "Fluid-based Analysis of a Network of AQM Routers Supporting TCP Flows with an Application to RED," *Proc. ACM SIGCOMM 2000*, 2000, pp. 151-160.

Morris, R. et al., "Scalable TCP Congestion Control," *Proc. IEEE INFOCOM 2000*, pp. 1176-1183.

Ott, T.J. et al., "SRED: Stablized RED", *Proc. IEEE INFOCOM'99*, NY, Mar. 21-25, 1999, pp. 1346-1355.

Silva, G.J. et al., "New Results on the Synthesis of PID Controllers," *IEEE Trans. Automatic Control*, vol. 47, No. 2, Feb. 2002, pp. 241-252.

Silva, G.J. et al., "Stabilization of Time Delay Systems," *Proc. American Control Conf.*, Chicago, Illinois, Jun. 2000, pp. 963-970.

Su, L. et al., "An Active Queue Management Scheme for Internet Congestion Control and its Application to Differentiated Services," *Proc. ICCCN 2000*, Las Vegas, Nevada, Oct. 2000, pp. 62-68.

Villamizar, C. et al., "High Performance TCP in ANSNET," *ACM Computer Commun. Rev.*, vol. 24, No. 5, Oct. 1995.

\* cited by examiner

RATE-BASED INTEGRAL CONTROL SCHEME FOR ACTIVE QUEUE MANAGEMENT

FIELD OF THE INVENTION

The present invention relates generally to network queue management, and more particularly to a technique for active queue management using integral control and rate-based information.

BACKGROUND OF THE INVENTION

Congestion control in the Internet has primarily been the responsibility of the end-to-end congestion control mechanisms of TCP (Transmission Control Protocol). However, with the rapid growth of the Internet and the stringent requirements for quality of service (QoS) support, it has become clear that the Internet could not exclusively rely on the end hosts to perform the end-to-end congestion control. Mechanisms are needed in the intermediate network elements to complement the end hosts congestion control mechanisms. Recognizing this, the Internet Engineering Tasks Force (IETF) has advocated the deployment of active queue management (AQM) mechanisms at the intermediate network elements (routers, switches, etc.) as a means of congestion control.

To perform AQM, the network elements are equipped with the means to detect incipient congestion and to signal the traffic sources before congestion actually occurs. AQM mechanisms allow the network elements to send explicit/implicit feedback of congestion to the end hosts by marking/dropping packets. The end hosts in turn react to the packet marking/dropping by reducing their data transmission rates. The main goals of AQM are to reduce the average queue lengths in the network elements and thereby decrease the end-to-end delay experienced by end user traffic, and maximize the utilization of network resources by reducing the packet loss that occurs when queues overflow.

The traditional queue management mechanism is "drop tail" which is simple to implement and is widely deployed. With drop tail mechanism, packets are dropped only at buffer overflow at which point congestion signals are conveyed to the end hosts. This results in a significantly long time period between the instant when congestion occurs and the instant when the end hosts reduce their data transmission rates. During this time period, more packets may be sent by the end hosts which could be eventually dropped. Drop tail can lead to problematic global synchronization of the traffic sources (where the sources ramp their traffic rates and backoff at the same time) and periods of low link utilization.

A number of AQM schemes have been proposed which use either queue size information for congestion control (so-called queue-based schemes) or traffic rate information (so-called rate-based schemes). Queue-based AQM schemes adapt their marking/dropping probabilities in a manner that depends on the queue size at the link. With small buffers they tend to perform poorly. For example, studies have shown that a technique such as RED (Random Early Detection) described by S. Floyd and V. Jacobson in "Random Early Detection Gateway for Congestion Avoidance," *IEEE/ACM Trans. Networking*, Vol. 1, No. 4, August 1993, pp. 397-413 performs well only when the queuing capacity is greater than the bandwidth-delay product. Quite naturally the dependence of a queue-based scheme on queue size information for control will require that there be sufficient buffering for effective process tracking and control. Very small buffers tend to complicate the control problem in this case.

A number of recent studies such as C. V. Hollot, V. Misra, D. Townsley, and W. B. Gong, "A Control Theoretic Analysis of RED," *Proc. IEEE INFOCOM* 2001, 2001, pp. 1510-1519, C. V. Hollot, V. Misra, D. Townsley, and W. B. Gong, "On Designing Improved Controllers for AQM Routers Supporting TCP Flows," *Proc. IEEE INFOCOM* 2001, 2001, pp. 1726-1734, Y. Chait, C. V. Hollot, and V. Misra, "Fixed and Adaptive Model-Based Controllers for Active Queue Management," *Proc. American Control Conf.*, Arlington, Va., June 25-27 2001, pp. 2981-2986, and V. Misra, W. B. Gong, and D. Townsley, "Fluid-based Analysis of a Network of AQM Routers Supporting TCP Flows with an Application to RED," *Proc. ACM SIGCOMM* 2000, 2000, pp. 151-160, have described queue-based AQM schemes which explicitly rely on dynamic modeling and feedback control principles. Central to these studies is the recognition that AQM schemes are essentially feedback control systems and that the principles of control theory can provide critical insight and guidance into the analysis and design of such schemes. The fluid flow analytical model of TCP described in "Fluid-based Analysis of a Network of AQM Routers Supporting TCP Flows with an Application to RED" by Misra et al. particularity expresses TCP dynamics in a form that allows control theoretic approaches to be applied for AQM design and analysis.

In view of the foregoing, it would be desirable to provide a technique for network queue management which overcomes the above-described inadequacies and shortcomings.

SUMMARY OF THE INVENTION

An object of the present invention is to provide an improved rate-based integral control scheme for active queue management.

According to an aspect of the invention there is provided a method for controlling a data flow in a data network, starting with selecting a stable integral controller gain $k_i$. Next measuring a data arrival rate R(n) at time n. Next, calculating a normalized error signal e(n), according to the relation $$e(n) = (T(n) - R(n))/x,$$

where T(n) is an assigned capacity at time n, and x is a nominal packet size. Next, a mark/drop probability p(n) is computed according to the relation $$p(n) = \min \{ \max [p(n-1) + k_i \cdot \Delta t \cdot e(n), 0], p_{max} \}$$

where $\Delta t$ is the time interval between a $(n-1)^{th}$ and the $n^{th}$ computation, and $0 < p_{max} \leq 1$. Finally a packet mark/drop routine is executed based upon the calculated mark/drop probability p(n).

Conveniently, the data arrival rate may be filtered by use of an exponentially weighted moving average scheme according to the relation $$R'(n) = (1-\beta) \cdot R'(n-1) + \beta \cdot R(n)$$

where $\beta$ is a filter gain parameter such that $0 < \beta < 1$,

R'(n-1) is the filtered data arrival rate at time n-1, and

R'(n) is the desired filtered data arrival rate at time n.

According to another aspect of the invention, preceding the packet/mark drop routine may be a bypassing routine involving the steps of testing the data arrival rate R(n) against a rate threshold $T_L$; and if the data arrival rate R(n)

is below or equal to the rate threshold $T_L$ then bypassing the step of executing a packet mark/drop routine.

Conveniently, the packet mark/drop routine may be realized according to a random number generator mark/drop scheme.

Also conveniently, the stable integral controller gain may be chosen from a pre-calculated regime of stable gains. A method for pre-calculating the regime may be as follows; starting with (1) obtaining for said network a value for said network a set of parameters k, $d_0$, and $\tau$, where k is a steady-state gain of said network, $d_0$ is a time delay of said network, and $\tau$ is a time constant of said network. Next step (2) determining the root $z_1$ in the interval $$\left(0, \frac{\pi}{2}\right) \text{ of } \cot(z_1) = \frac{\tau}{d_0} z_1,$$

and then computing the range of stable gains for $k_i$ for this particular network as $$-\frac{\tau}{k d_0^2} z_1 \sqrt{z_1^2 + \frac{d_0^2}{\tau^2}} < k_i < 0.$$

In accordance with another other aspect of the present invention, there is provided an apparatus for controlling a data flow in a data network, the apparatus being configured according to the methods described above.

In accordance with another aspect of the present invention, there is provided an article of manufacture carrying instructions for a method for controlling a data flow in a data network. In a separate aspect, there is provided a signal embodied in a carrier wave representing instructions for a method for controlling a data flow in a data network according to an integral control scheme.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments, which are within the scope of the present invention as disclosed and claimed herein.

BRIEF DESCRIPTION OF THE DRAWINGS

The invention will be further understood from the following detailed description of embodiments of the invention and accompanying drawings, in which.

DETAILED DESCRIPTION

Figure 1:
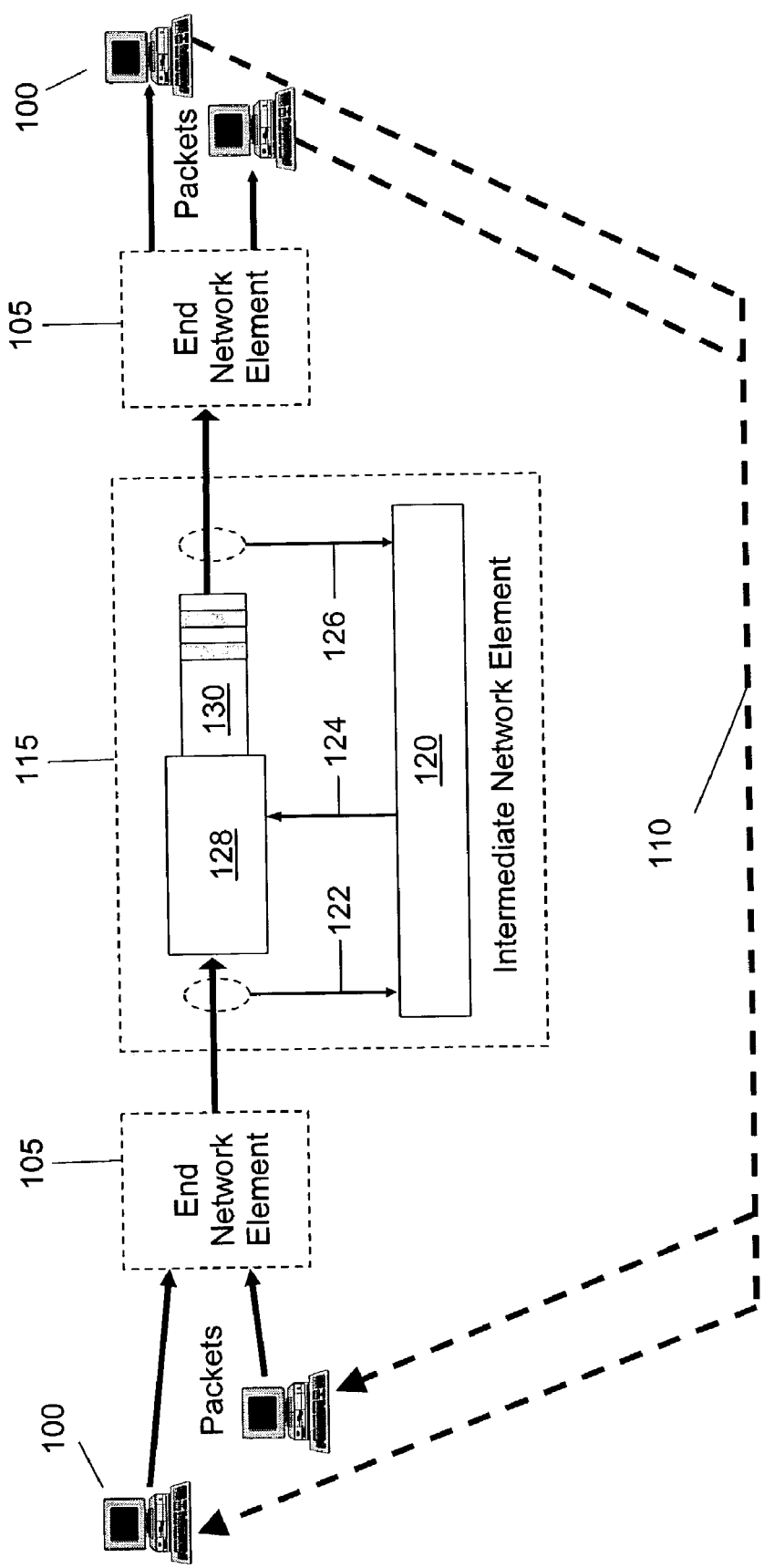
FIG. 1 is a diagram of an Active Queue Management controller in an Intermediate Network Element according to an embodiment of the invention.

A high level depiction of an implementation of the active queue management integral control scheme according to a possible embodiment is given in FIG. 1.

Users 100 communicate with End Network Elements 105 which pass packet data either directly or through Intermediate Network Elements 115, to other End Network Elements 105. End-to-end congestion control mechanisms under normal TCP (Transmission Control Protocol) rely upon Implicit/Explicit Feedback Signals 110. Examples of Implicit/Explicit Feedback Signals 110 typically include duplicate TCP acknowledgement packets, timeouts, and marked packets.

In order to meet the stringent requirements for Quality of Service (QoS) of users, and the increases in data volume with the rapid growth of the Internet, it is advantageous to provide congestion control mechanisms at intermediate points to complement the end hosts congestion control mechanisms. According to one aspect of the invention, Intermediate Network Element 115 has been equipped with such a mechanism for congestion control.

Within Intermediate Network Element 115 are a Integral Controller 120, a queue means 130, an arrival rate measurement means 122, a target rate measurement means 126, a packet mark/drop module 128, and a mark/drop probability control means 124 by which the Integral Controller 120 influences the packet mark/drop module 128 according to a scheme described hereafter.

Figure 2:
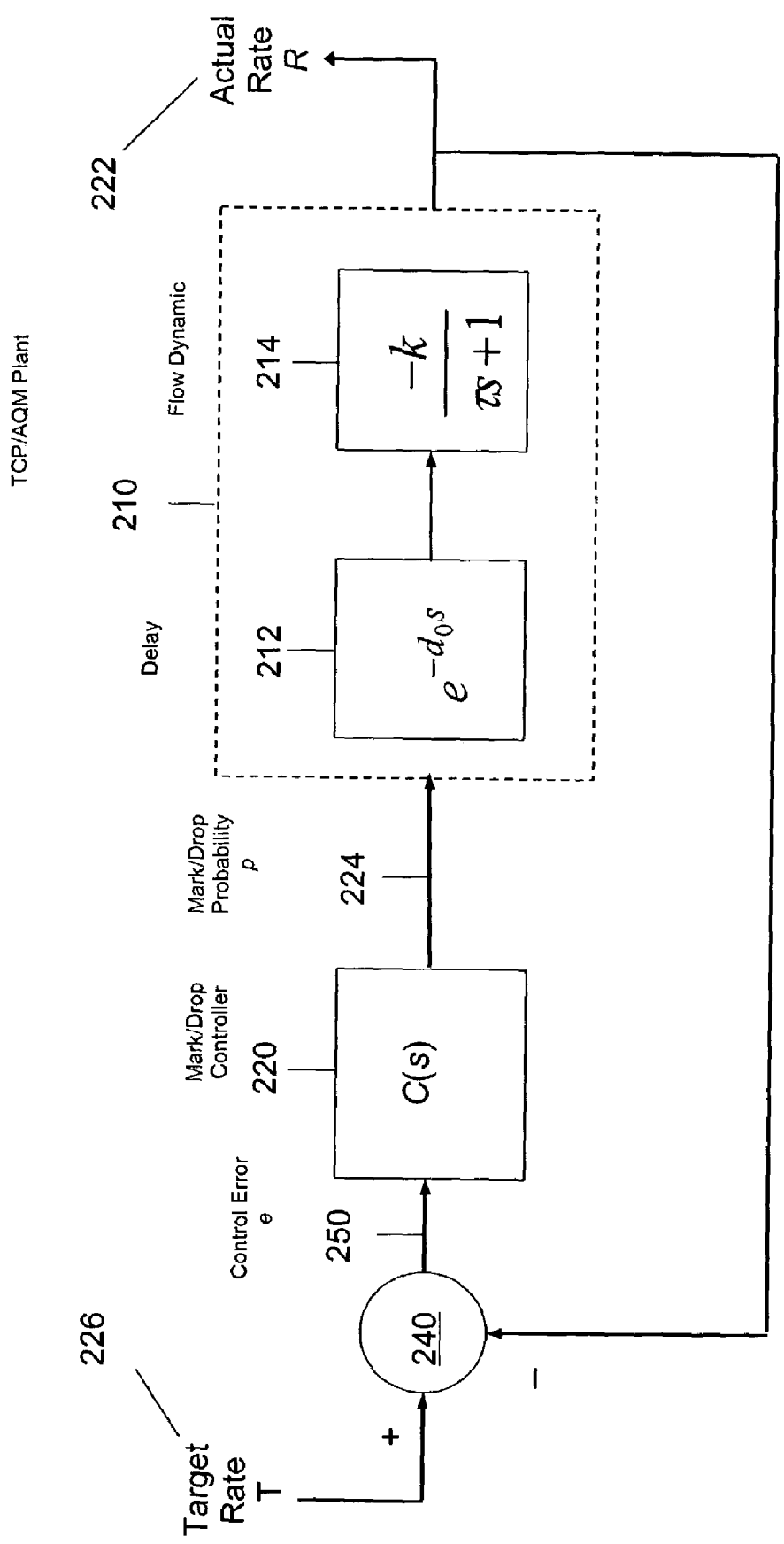
FIG. 2 is a diagram of a closed loop control system according to an embodiment of the invention.

A control system oriented depiction of the system of FIG. 1 may be seen in FIG. 2 where the closed-loop system is represented as having two main elements; TCP/AQM plant 210 and the control-function means 220. The control system functions by comparing a desired Target-Rate "T" 226 with an Actual-Rate "R" 222 via a summer 240 which generates a control error "e" 250 by determining the difference between the two rates. This difference is used as an input to the control-function means 220 which generates a mark/drop probability threshold "p" 224. Changes in the threshold for marking or dropping packets results in an eventual change in the Actual-Rate "R" 222 as the effects propagate through the system. As with all closed loop systems, the control-function means 220 must have a control function response chosen so as to render a stable closed-loop system response. If this condition is not met the resultant performance will be deleterious to the network operation, possibly to the point of causing performance degradation.

In order to be able to determine the stability requirements for the control-function means, the open loop transfer function for TCP/AQM plant 210 must be established. This may be done as follows.

A simplified rate-based fluid-flow model of a TCP source i assessing a single link is described by the following nonlinear differential equation:

$$\dot{r}_i(t) = \frac{1}{d_i^2(t)} - \theta r_i(t) r_i(t - d_i(t)) p(t - d_i(t)) \quad (1)$$

where $\dot{r}$ denotes the time-derivative of r, $r_i$ is rate of the TCP source (in packets per second), $d_i$ is the round-trip time (RTT) of the TCP source (in seconds), p is the marking/dropping probability of a TCP packet at the link, and $\theta$ is a parameter characteristic of the type of TCP source. This model of TCP ignores the slow-start and the timeout behavior of TCP. Note that $r_i$ and p are bounded, respectively, as follows; $r_i \epsilon [0,C]$, $p \epsilon [0,1]$, where C is the link capacity (in packets per second).

Denoting $p_0$ as the steady-state (or operating point) of the marking/dropping probability of a TCP source and assuming a constant RTT $d_0$, the steady-state throughput $r_0$ can be obtained as $$0 = \frac{1}{d_0^2} - \theta r_0^2 p_0 \text{ or}$$

$$r_0 = \frac{1}{d_0} \sqrt{\frac{1}{\theta p_0}}.$$

If the parameter $\theta$ takes on the value of $\frac{2}{3}$, the steady-state throughput of TCP is obtained as $$r_0 = \frac{1}{d_0} \sqrt{\frac{3}{2 p_0}}.$$

Making the approximation relating data transmission rate and window size $$r_i(t) \approx W_i(t)/d_i(t)$$

and assuming $d_i(t) = d_i$=constant, it obtains that $$\dot{r}_i(t) \approx \frac{d}{dt}\left(\frac{W_i(t)}{d_i(t)}\right) = \frac{1}{d_i}\frac{dW_i(t)}{dt} - \frac{W_i(t)}{d_i^2}\frac{dd_i}{dt} \approx \frac{1}{d_i}\frac{dW_i(t)}{dt}.$$

With this, it can be seen that making the approximation $r_i(t) \approx W_i(t)/d_i(t)$ shows that the rate-based fluid-flow model of a TCP source is essentially equivalent to a window-based nonlinear fluid-flow TCP model.

Assuming a constant RTT $d_0$, rewrite the initial equation as $$f(r_i, r_{i,d}, p) = \dot{r}_i(t) = \frac{1}{d_0^2} - \theta r_i(t) r_{i,d}(t) p(t - d_0) \quad (2)$$

where $$r_{i,d}(t) = r_i(t - d_0).$$

Using Taylor series expansion, the small-signal linearization of $$f(r_i, r_{i,d}, p) = \dot{r}_i(t)$$

about an operating point $(r_0, p_0)$ is given as $$\delta \dot{r}_i(t) = \frac{\partial f}{\partial r_i}\bigg|_{r_0, p_0} \delta r_i(t) + \frac{\partial f}{\partial r_{i,d}}\bigg|_{r_0, p_0} \delta r_{i,d}(t) + \frac{\partial f}{\partial p}\bigg|_{r_0, p_0} \delta p(t - d_0) \quad (3)$$

where $$\delta r_i(t) = r_i(t) - r_0$$

$$\delta r_{i,d}(t) = r_{i,d}(t) - r_0$$

$$\delta p(t - d_0) = p(t - d_0) - p_0$$

and $$\frac{\partial f}{\partial r_i}\bigg|_{r_0, p_0} = \frac{\partial f}{\partial r_{i,d}}\bigg|_{r_0, p_0} = -\theta r_0 p_0 \quad \frac{\partial f}{\partial p}\bigg|_{r_0, p_0} = -\theta r_0^2$$

The linearized equation (3) then becomes $$\delta \dot{r}_i(t) = -\theta r_0 p_0 (\delta r_i(t) + \delta r_{i,d}(t)) - \theta r_0^2 \delta p(t - d_0). \quad (4)$$

Making the approximation $r_i(t) \approx r_{i,d}(t)$ in (4), it follows that $$\delta \dot{r}_i(t) = -2\theta r_0 p_0 \delta r_i(t) - \theta r_0^2 \delta p(t - d_0) \quad (5)$$

Assume that the link of capacity C is shared by a constant number N of TCP sources. The aggregate rate on the link R(t) is given by $$\sum_{i=1}^{N} r_i(t) = R(t). \quad (6)$$

From (6), the equilibrium point of the system can be expressed as $$\sum_{i=1}^{N} r_0 = R_0 = \rho C, \text{ or} \quad (7)$$

$$r_0 = \frac{\rho C}{N}, \quad (8)$$

where $\rho \epsilon (0,1]$ is a target utilization factor. From (1) and (8), the equilibrium point of the marking/dropping probability can be expressed as $$p_0 = \frac{1}{d_0^2 \theta r_0^2} = \frac{N^2}{\theta (d_0 \rho C)^2}. \quad (9)$$

Defining $\delta R(t) = R(t) - R_0$, it is known from (6) that $$\delta R(t) = \sum_{i=1}^{N} \delta r_i(t) \text{ and} \quad (10)$$

-continued $$\delta \dot{R}(t) = \sum_{i=1}^{N} \delta \dot{r}_i(t) \quad (11)$$

$$= -2\theta r_0 p_0 \sum_{i=1}^{N} \delta r_i(t) - \sum_{i=1}^{N} \theta r_0^2 \delta p(t - d_0)$$

$$= -2\theta r_0 p_0 \delta R(t) - N\theta r_0^2 \delta p(t - d_0)$$

Substituting the equilibrium points $(r_0, p_0)$ in (11), it follows that $$\delta \dot{R}(t) = -\frac{2N}{d_0^2 \rho C} \delta R(t) - \frac{\theta \rho^2 C^2}{N} \delta p(t - d_0) \text{ or} \quad (12)$$

$$\frac{d_0^2 \rho C}{2N} \delta \dot{R}(t) = -\delta R(t) - \frac{\theta d_0^2 \rho^3 C^3}{2N^2} \delta p(t - d_0) \quad (13)$$

$$\tau \delta \dot{R}(t) + \delta R(t) = -k \delta p(t - d_0)$$

where $$\tau = \frac{d_0^2 \rho C}{2N} \text{ and } k = \frac{\theta d_0^2 \rho^3 C^3}{2N^2}.$$

Taking the Laplace transform of (13) it obtains that $$\tau s \Re(s) + \Re(s) = -k e^{-d_0 s} P(s), \quad (14)$$

where $\Re(s)$ is the Laplace transform of $\delta R(t)$ and $e^{-sd_0}P(s)$ is the Laplace transform of $\delta p(t-d_0)$.

The open-loop transfer function of the TCP/AQM plant may be obtained from (14) as $$G(s) = \frac{\Re(s)}{P(s)} = \frac{-k e^{-d_0 s}}{\tau s + 1}. \quad (15)$$

In (15), $-k$ represents the steady-state (or static) gain of the TCP/AQM plant, $d_0$ represents the time delay (or dead time), and $\tau$ represents the time constant of the plant.

The step response of the model (15) is $$R(t) = -k(1 - e^{-(t-d_0)/\tau}). \quad (16)$$

From (16), it follows that the average residence time is $$T_{av} = \frac{\int_0^{\infty} (R(\infty) - R(t)) dt}{-k} = \tau e^{d_0/\tau} \approx d_0 + \tau \quad (17)$$

Figure 3:
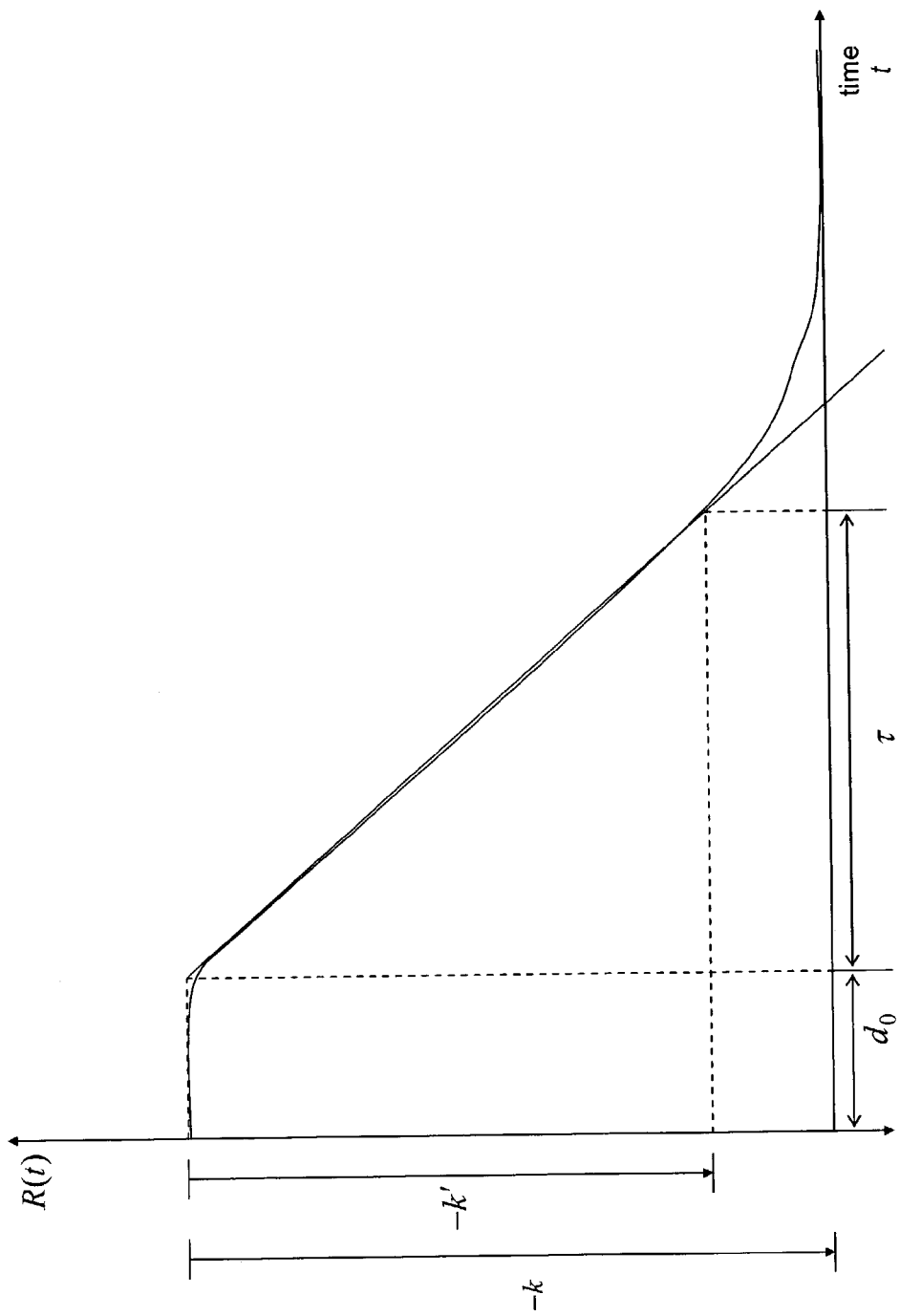
FIG. 3 is a plot of a typical open loop response of the TCP/AQM plant according to an embodiment of the invention.

The ratio $$\eta = \frac{d_0}{d_0 + \tau} = \frac{d_0}{T_{av}} \quad (18)$$

is called the normalized dead time and has the property $0 \leq \eta \leq 1$. This quantity can be used to characterize the difficulty of controlling a process. It is sometimes called the controllability ratio. It has been observed that processes with small $\eta$ are easy to control and that the difficulty in controlling the system increases as $\eta$ increases. The parameters in the model (15) are represented graphically in FIG. 3. The parameter $-k'$ is simply the gain corresponding to the time distance $d_0 + \tau$.

The goal of the control system is to mark/drop packets such that the aggregate rate of the active TCP connections will match the available capacity while at the same time maintain minimal queue size and high link utilization. Having established an expression for the open loop transfer function for TCP/AQM plant 210, it is now possible to consider an expression for the system as a whole.

Returning to FIG. 2 and noting again that Target-Rate "T" 226 is the control target, Actual-Rate "R" 222 is the output of the plant (actual traffic arrival rate), mark/drop probability threshold "p" 224 is the control input, TCP/AQM plant 210 given by (15) as the plant to be controlled, and C(s), the control-function means 220 is to be a integral controller.

The Laplace expression for the case of a integral controller may be written as, $$C(s) = \frac{k_i}{s}, \quad (19)$$

where $k_i$ is integral gain of the controller.

The closed-loop transfer function of the TCP/AQM plant is then given as $$G_{AQM}(s) = \frac{C(s)G(s)}{1 + C(s)G(s)} = \frac{-k k_i e^{-d_0 s}}{\tau s^2 + s - k k_i e^{-d_0 s}}. \quad (20)$$

The objective now is to determine the values of the parameter $k_i$ for which the closed-loop system is stable.

Using an extension of the Hermite-Biehler Theorem applicable to quasipolynomials a detailed analytical characterization of the stabilizing feedback gains of the closed-loop TCP/AQM system may be performed as follows.

The characteristic equation of a control system with time delay can be expressed in the general form as $$F(s) = d(s) + e^{-sT_1} n_1(s) + e^{-sT_2} n_2(s) + \ldots + e^{sT_m} n_m(s), \quad (21)$$

where $d(s)$, $n_i(s)$ for $i=1,2,\ldots,m$, are polynomials with real coefficients.

Characteristic equations of the form (21) are also referred to as quasipolynomials. It can be shown that the so-called Hermite-Biehler Theorem for Hurwitz polynomials does not carry over to arbitrary functions $f(s)$ of the complex variable s. However, a suitable extension of the Hermite-Biehler Theorem can be developed to study the stability of certain classes of quasipolynomials characterized as follows.

If the following assumptions are made in (21)

A1: $\deg[d(s)] = n$ and $\deg[n_i(s)] \leq n$ for $i=1,2,\ldots,m;$

A2: $0 < T_1 < T_2 < \ldots < T_m$, then instead of (21), one can consider the quasipolynomial $$F^*(s) = e^{sT_m} F(s) = e^{sT_m} d(s) + e^{s(T_m - T_1)} n_1(s) + e^{s(T_m - T_2)} n_2(s) + \ldots + n_m(s). \quad (22)$$

Since $e^{sT_m}$ does not have any finite roots, the roots of F(s) are identical to those of F*(s). The quasipolynomial F*(s), however, has a principal term, i.e., the coefficient of the term containing the highest powers of s and $e^s$ is nonzero. It then follows that this quasipolynomial is either of the delay (i.e., retarded) or of the neutral type. From this, it follows that the stability of the system with characteristic equation (21) is equivalent to the condition that all the roots of F*(s) be in the open left-half plane. Equivalently, it can be stated that F*(s) is Hurwitz or stable. The theorem below gives necessary and sufficient conditions for the stability of F*(s):

Theorem 1: Let F*(s) be given by (22), and write $$F^*(j\omega)=F_r(\omega)+jF_i(\omega)$$

where $F_r(\omega)$ and $F_i(\omega)$ represent the real and imaginary parts of F*(s), respectively. Under assumptions A1 and A2, F*(s) is stable if and only if 1) $F_r(\omega)$ and $F_i(\omega)$ have only simple real roots and these interlace
2) $\dot{F}_i(\omega_0)F_r(\omega_0)-\dot{F}_r(\omega_0)F_i(\omega_0)>0$, for some $\omega_0$ in $(-\infty,\infty)$; where $\dot{F}_r(\omega)$ and $\dot{F}_i(\omega)$ denote the first derivative with respect to $\omega$ of $F_r(\omega)$ and $F_i(\omega)$, respectively.

Using this theorem the set of all integral gains that stabilize the first-order TCP/AQM plant with time delay described by (15) may be characterized. A key step in applying Theorem 1 to check stability is to ensure that $F_r(\omega)$ and $F_i(\omega)$ have only real roots. Such a property can be ensured by using the following result:

Theorem 2: Let M and L denote the highest powers of s and $e^s$, respectively, in F*(s). Let $\eta$ be an appropriate constant such that the coefficients of the terms of highest degree in $F_r(\omega)$ and $F_i(\omega)$ do not vanish at $\omega=\eta$. Then for the equations $F_r(\omega)=0$ or $F_i(\omega)=0$ to have only real roots, it is necessary and sufficient that in the intervals $$-2l\pi+\eta \leq \omega \leq 2l\pi+\eta, l=1,2,3,\ldots$$

$F_r(\omega)$ or $F_i(\omega)$ have exactly 4lL+M real roots starting with a sufficiently large l.

It is now possible to determine analytically the region in the $k_i$ parameter space for which the closed-loop TCP/AQM plant is stable.

First analyze the system given by (20) without time delay, i.e., $d_0=0$. In this case, the closed-loop characteristic equation of the system is given by $$F(s)=\tau s^2+s-kk_i. \quad (23)$$

For this second-order polynomial, it can be determined necessary and sufficient conditions that the controller and the plant parameters have to satisfy to guarantee the stability of the delay-free closed-loop system. Solving the characteristic equation (23) for the roots, it follows that $$s_{1,2} = \frac{-1 \pm \sqrt{1+4\tau kk_i}}{2\tau}. \quad (24)$$

Given that $\tau>0$ and $k>0$ are always true for the TCP/AQM plant, the closed-loop delay-free system is stable for the following condition $$k_i<0. \quad (25)$$

Next, let us consider the case where the time delay of the plant model is greater than zero, i.e., $d_0>0$. The closed-loop characteristic equation of the system is then $$F(s)=-kk_i e^{-d_0 s}+(1+\tau s)s. \quad (26)$$

It is necessary to determine the set of all stabilizing gains for the system.

In order to study the stability of the closed-loop system, it is necessary to determine if all the roots of (26) lie in the open left half plane. The presence of the exponential term $e^{-d_0 s}$ results in the number of roots of F(s) being infinite and this makes the stability check very difficult. However, Theorem 1 can be invoked to determine the set of all stabilizing gains $k_i$. This procedure is explained as follows.

First consider the quasipolynomial F*(s) defined by $$F^*(s)=e^{d_0 s}F(s)=-kk_i+(1+\tau s)se^{d_0 s}. \quad (27)$$

Substituting $s=j\omega$, and using the relationship $e^{d_0 j\omega}=\cos(d_0\omega)+j\sin(d_0\omega)$, the following expression results $$F^*(j\omega)=F_r(\omega)+jF_i(\omega)$$

where $$F_r(\omega)=-kk_i-\omega\sin(d_0\omega)-\tau\omega^2\cos(d_0\omega)$$

$$F_i(\omega)=\omega[\cos(d_0\omega)-\tau\omega\sin(d_0\omega)]$$

For convenience of analysis, make the following change of variables, $z=d_0\omega$. Thus, it is possible to rewrite the real and imaginary parts of F*(j$\omega$) as $$F_r(z) = -kk_i - \frac{1}{d_0}z\sin(z) - \frac{\tau}{d_0^2}z^2\cos(z) \quad (28)$$

$$F_i(z) = \frac{1}{d_0}\cdot z\cos(z) - \frac{\tau}{d_0^2}z^2\sin(z). \quad (29)$$

Theorem 1 requires a check of two conditions to ensure the stability of the quasipolynomial F*(s).

Check of Condition 2 of Theorem 1: First check if $$E(\omega_0)=\dot{F}_i(\omega_0)F_r(\omega_0)-F_i(\omega_0)\dot{F}_r(\omega_0)>0$$

for some $\omega_0$ in $(-\infty,\infty)$.

Taking $\omega_0=z_0=0$, for instance, gives $F_r(z_0)=-kk_i$ and $F_i(z_0)=0$. Also obtained is $$\dot{F}_r(z_0)=0$$

and $$\dot{F}_i(z) = \left(\frac{d_0-\tau z^2}{d_0^2}\right)\cos(z) - \left(\frac{2\tau+d_0}{d_0^2}\right)z\sin(z), \Rightarrow \dot{F}_i(z_0) = \frac{1}{d_0}.$$

From these it may be seen that $$E(z_0) = \left(\frac{1}{d_0}\right)(-kk_i).$$

Given that for the TCP/AQM plant the conditions $\tau>0$ and $k>0$ hold true, it is required that $F_r(z_0)=-kk_i>0$ (i.e., $k_i<0$) for $E(z_0)>0$. This result is consistent with that given in (25).

Check of Condition 1 of Theorem 1: Now check the interlacing of the roots of $F_r(z)$ and $F_i(z)$. The roots of the imaginary part, i.e., $F_i(z)=0$ can be determined from (29). This yields $$\frac{z}{d_0}\left[\cos(z) - \frac{\tau}{d_0}z\sin(z)\right] = 0.$$

It may be seen from this equation that z=0 is a root of $F_i(z)$, or $$\cot(z) = \frac{\tau}{d_0} z \qquad (30)$$

Figure 4:
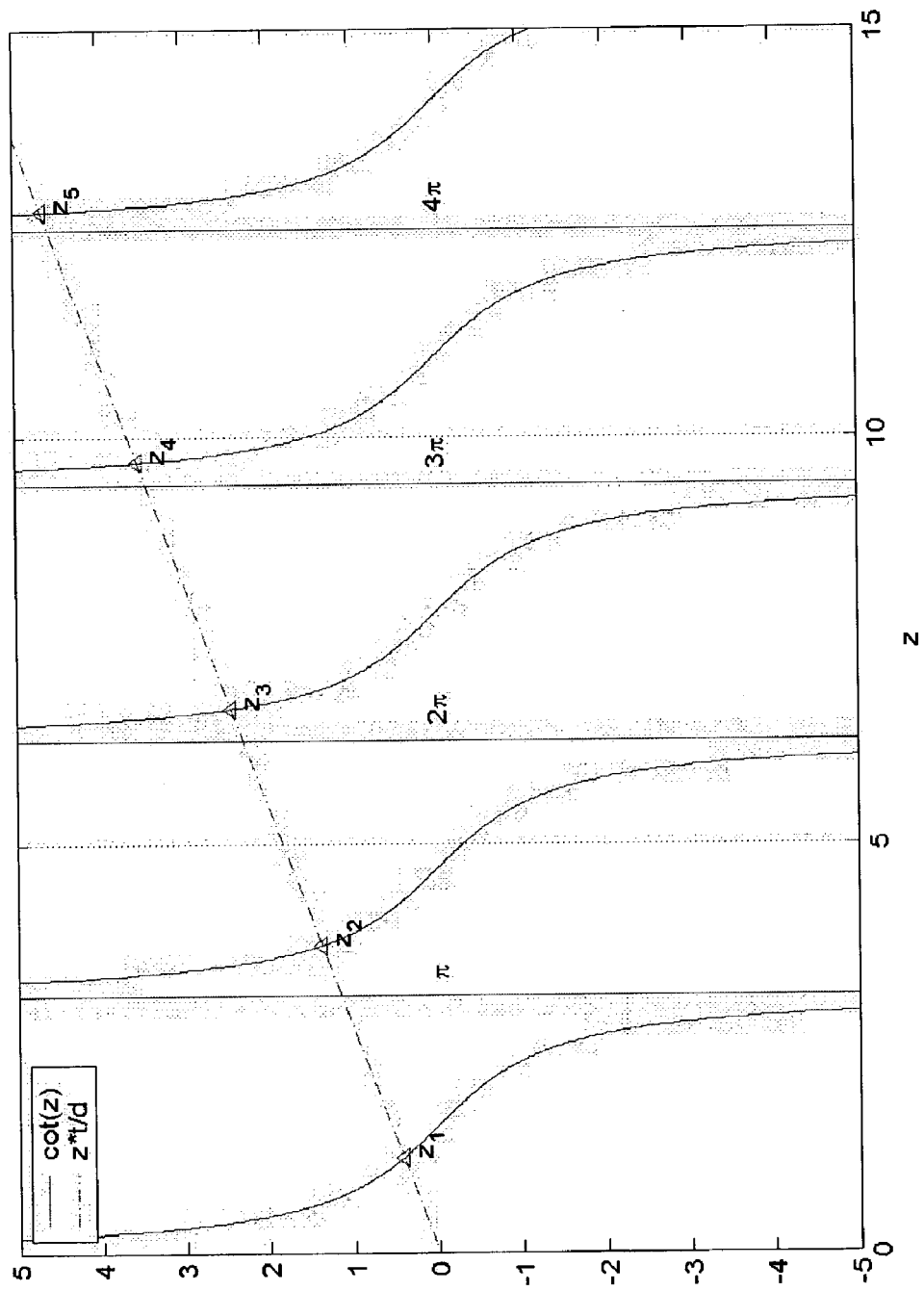
FIG. 4 is a plot of the two terms in Equation (30) for a general system.

One root of the imaginary part $F_i(z)$ is $z_0=0$ but the other roots are difficult to find and require an analytical solution of (30). However, a plot of the two terms in (30), (i.e., $\cot(z)$ and $$\frac{\tau}{d_0} z)$$

can be used to understand the nature of the real solution. It is possible to plot these two terms for arbitrarily selected values of k, $\tau$ and $d_0$. The general nature of the plots, however, does not change with the use of other values. Arranged in increasing order of magnitude, denote the positive real roots of (30) by $z_j$, j=1,2,3, ... From FIG. 4, it may be clearly seen that the non-negative real roots of the imaginary part $F_i(z)$ satisfy $$z_1 \in \left(0, \frac{\pi}{2}\right), z_2 \in \left(\pi, \frac{3\pi}{2}\right), z_3 \in \left(2\pi, \frac{5\pi}{2}\right), z_4 \in \left(3\pi, \frac{7\pi}{2}\right), \ldots \qquad (31)$$

Theorem 2 may now be applied to check if $F_i(z)$ has only real roots. Substitute $s_1 = d_0 s$ in the expression for $F^*(s)$ (in (27)). It may now be seen that the new quasipolynomial in $s_1$ yields M=2 and L=1. Choose $$\eta = \frac{\pi}{4}$$

to satisfy the requirement that $F_i(z)$ does not vanish at $\omega = \eta$, i.e., $\sin(\eta) \neq 0$. From FIG. 4, it may be seen that in the interval $$\left[0, 2\pi - \frac{\pi}{4}\right] = \left[0, \frac{7\pi}{4}\right],$$

$F_i(z)=0$ has 3 real roots including a root at the origin $z_0=0$. It is further apparent that $F_i(z)$ is an odd function. It therefore follows that in the interval $$\left[-\frac{7\pi}{4}, \frac{7\pi}{4}\right],$$

$F_i(z)$ will have 5 real roots. It is also possible to observe that $F_i(z)$ has one real root in $$\left(\frac{7\pi}{4}, \frac{9\pi}{4}\right].$$

Thus, $F_i(z)$ has 4L+M=6 real roots in the interval $$\left[-2\pi + \frac{\pi}{4}, 2\pi + \frac{\pi}{4}\right].$$

Furthermore, $F_i(z)$ has 2 real roots in each of the intervals $$\left[2l\pi + \frac{\pi}{4}, 2(l+1)\pi + \frac{\pi}{4}\right] \text{ and } \left[-2(l+1)\pi + \frac{\pi}{4}, -2l\pi + \frac{\pi}{4}\right]$$

for l=1,2,3, ... Hence it follows that $F_i(z)$ has exactly 4lL+M real roots in the interval $$\left[-2l\pi + \frac{\pi}{4}, 2l\pi + \frac{\pi}{4}\right]$$

for l=1,2,3, ..., which by Theorem 2 implies that $F_i(z)$ has only real roots.

$F_r(z)$ can now be evaluated at the roots of the imaginary part $F_i(z)$. For $z_0=0$, it was obtained previously $F_r(z_0)=-kk_i$. Now using (28), the following obtains for $z_j$, j=1,2,3, ..., $$F_r(z_j) = -kk_i - \frac{1}{d_0} z_j \sin(z_j) - \frac{\tau}{d_0^2} z_j^2 \cos(z_j).$$

Using $$\frac{z}{d_0} = \frac{\cot(z)}{\tau}$$

from (30) in the above equation, it obtains that $$F_r(z_j) = -kk_i - \frac{\sin(z_j)\cot(z_j)}{\tau} - \frac{\tau}{d_0^2} z_j^2 \cos(z_j) \qquad (32)$$

$$\Rightarrow F_r(z_j) = -kk_i - \frac{\tau}{d_0^2}\left[z_j^2 + \frac{d_0^2}{\tau^2}\right]\cos(z_j)$$

Therefore $$F_r(z_j) = -k[k_i + a(z_j)], \qquad (33)$$

where $$a(z_j) = \frac{\tau}{k d_0^2}\left[z_j^2 + \frac{d_0^2}{\tau^2}\right]\cos(z_j). \qquad (34)$$

From the previous results, $F_r(z_0) = -kk_i > 0$ (i.e., $k_i < 0$). Then interlacing of the roots of $F_r(z)$ and $F_i(z)$ is equivalent to $F_r(z_1) < 0$, $F_r(z_2) > 0$, $F_r(z_3) < 0$, and so on. Using this fact, the result $F_r(z_0) = -kk_i > 0$ and Equation (33), it may be seen that $$F_r(z_0) > 0 \Rightarrow k_i < 0 \qquad (35)$$

-continued $$F_r(z_1) < 0 \Rightarrow k_i > -a(z_i) = a_1$$

$$F_r(z_2) > 0 \Rightarrow k_i < -a(z_2) = a_2$$

$$F_r(z_3) < 0 \Rightarrow k_i > -a(z_3) = a_3$$

$$\vdots$$

The following observations can now be made (noting that for the TCP/AQM plant the $\tau > 0$, $d_0 \geq 0$ and $k > 0$ hold true);

Observation 1: From (31), it is seen that $z_j$ for odd values of j (1, 3, 5, . . . ), are in the first quadrant. Thus, for odd values of j, $\cos(z_j) > 0$ and from (34), it may be concluded that $a(z_j) > 0$ for odd values of the parameter j.

Observation 2: Similarly, it is seen from (31) that $Z_j$ for even values of j, (2, 4, 6, . . . ) are in the third quadrant. Thus, for even values of j, $\cos(z_j) < 0$ and from (34), it follows that $a(z_j) < 0$ for even values of the parameters All the set of inequalities obtained above can now be rewritten as $$\max_{j=1,3,5,\ldots} \{a_j\} < k_i < \min_{j=0,2,4,6,\ldots} \{a_j\}. \quad (36)$$

From (30) and the relationship $1+\tan^2(z_j)=\sec^2(z_j)$, it follows that $$\cos(z_j) = \pm \sqrt{\frac{1}{1+\tan^2(z_j)}} = \pm \frac{z_j}{\sqrt{z_j^2 + \frac{d_0^2}{\tau^2}}}. \quad (37)$$

From the foregoing analysis $z_j$, j=1,2,3, . . . , are solutions of (30). Now using the above expression, it is possible to rewrite $a(z_j)$ defined in (34) as $$a(z_j) = \pm \frac{\tau}{kd_0^2} z_j \sqrt{z_j^2 + \frac{d_0^2}{\tau^2}} \quad (38)$$

where according to Observations 1 and 2 above, the plus sign (+) is used for odd values of j, and the minus sign (−) is used for even values of j.

With (38) it is possible to make the following observation:

Observation 3: Since $z_1 < z_2 < z_3 < z_4 < \ldots$ , from (38) (and Observations 1 and 2), it is seen that $a(z_j)$ is a monotonically increasing function for odd values of j (1, 3, 5, . . . ), i.e., $a(z_1) < a(z_3) < a(z_5) < \ldots$ , and $a(z_j)$ is a monotonically decreasing function for even values of j (0, 2, 4, 6, . . . ), i.e., $a(z_0) > a(z_2) > a(z_4) > a(z_6) > \ldots$ It is also clear that $a(z_0)=0$, $z_0=0$.

From this observation, the bounds for $k_i$ in (36) can now be expressed as $$-a(z_1) < k_i < 0, z_1 \in \left(0, \frac{\pi}{2}\right). \quad (39)$$

Therefore, for the interlacing property to hold it must be that $$-\frac{\tau}{kd_0^2} z_1 \sqrt{z_1^2 + \frac{d_0^2}{\tau^2}} < k_i < 0, z_1 \in \left(0, \frac{\pi}{2}\right). \quad (40)$$

Note that for the values of $k_i$ in this range, the interlacing property and the fact that the root of $F_i(z)$ are all real can be used in Theorem 2 to guarantee that $F_r(z)$ also has only real roots. At this point, it is seen that all the conditions of Theorem 1 are satisfied.

Figure 5:
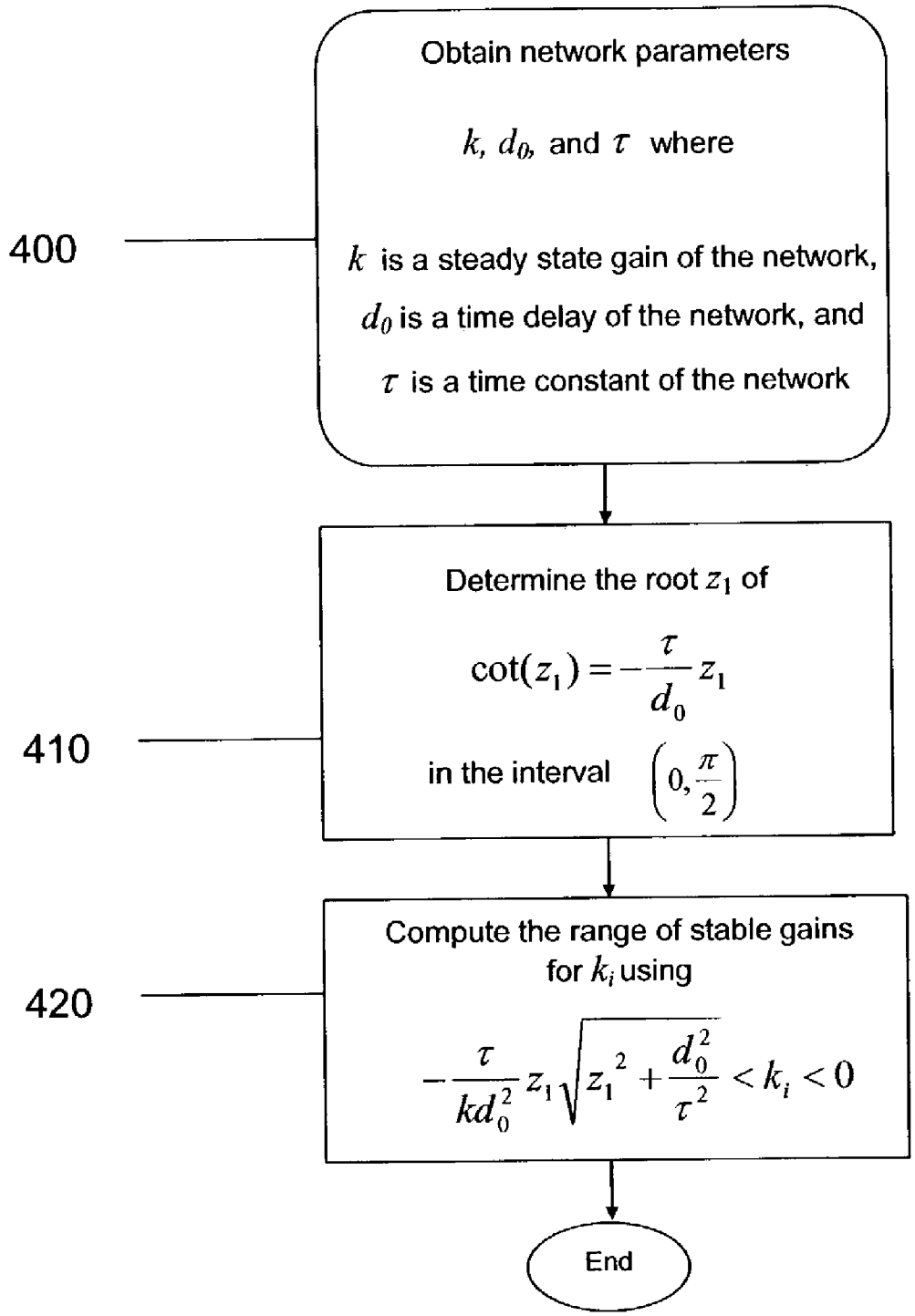
FIG. 5 is a block diagram of a routine for determining the stable integral gains for a closed-loop TCP/AQM system according to an embodiment of the invention.

It is possible to summarize the algorithm for determining the integral controller parameters as shown in FIG. 5. The process initiates, at step 400, by obtaining for a network a set of parameters k, $d_0$, and $\tau$, where k is a steady-state gain of said network, $d_0$ is a time delay of said network, and $\tau$ is a time constant of said network. Next, at step 410, determining the root $z_1$ in the interval $$z_1 \in \left(0, \frac{\pi}{2}\right)$$

$$\cot(z) = \frac{\tau}{d_0} z,$$

Next at step 420, computing the range of stable gains for $k_i$ for this particular network as $$-\frac{\tau}{kd_0^2} z_1 \sqrt{z_1^2 + \frac{d_0^2}{\tau^2}} < k_i < 0.$$

As an example illustrating the use of the algorithm, consider the sample problem of characterizing the stabilizing integral controller gains for a TCP/AQM system with nominal operating parameters of T=$\rho$C=45 Mbps, N=800, and $d_0$=55 msec. We also select a small nominal packet size of 64 bytes which we use only for the computation of the stability region. A smaller packet size is selected for this purpose because of the fluid-flow model used in the TCP/AQM control problem. For this system k=1.0515×10$^6$ and $\tau$=0.1652. Note that in deriving the control parameters, T is the control target and the TCP parameter $\theta$=⅔. Following the procedure described in FIG. 5, compute $$z_1 \in \left(0, \frac{\pi}{2}\right)$$

satisfying (30) to obtain $z_1$=0.54583. From this, it is possible to obtain the range of stable $k_i$ gains as $-1.8184 \times 10^{-5} < k_i < 0$.

As a simple assessment of the region of gains obtained, the system controller response and the system step response of a gain chosen from within the region may be examined. Set the controller gain $k_i$ (inside the stabilizing range) as $-1.5 \times 10^{-6}$.

With this value of $k_i$, the characteristic quasipolynomial of the system is given by $$F^*(s) = 1.5773 + (1+0.1652s)se^{d_0 s}.$$

Substituting $s=j\omega$, it follows that $$F^*(j\omega) = [1.5773 - \omega \sin(d_0\omega) - 0.1652\omega^2 \cos(d_0\omega)]$$
$$+ j[\omega \cos(d_0\omega) - 0.1652\omega^2 \sin(d_0\omega)]$$

Figure 6:
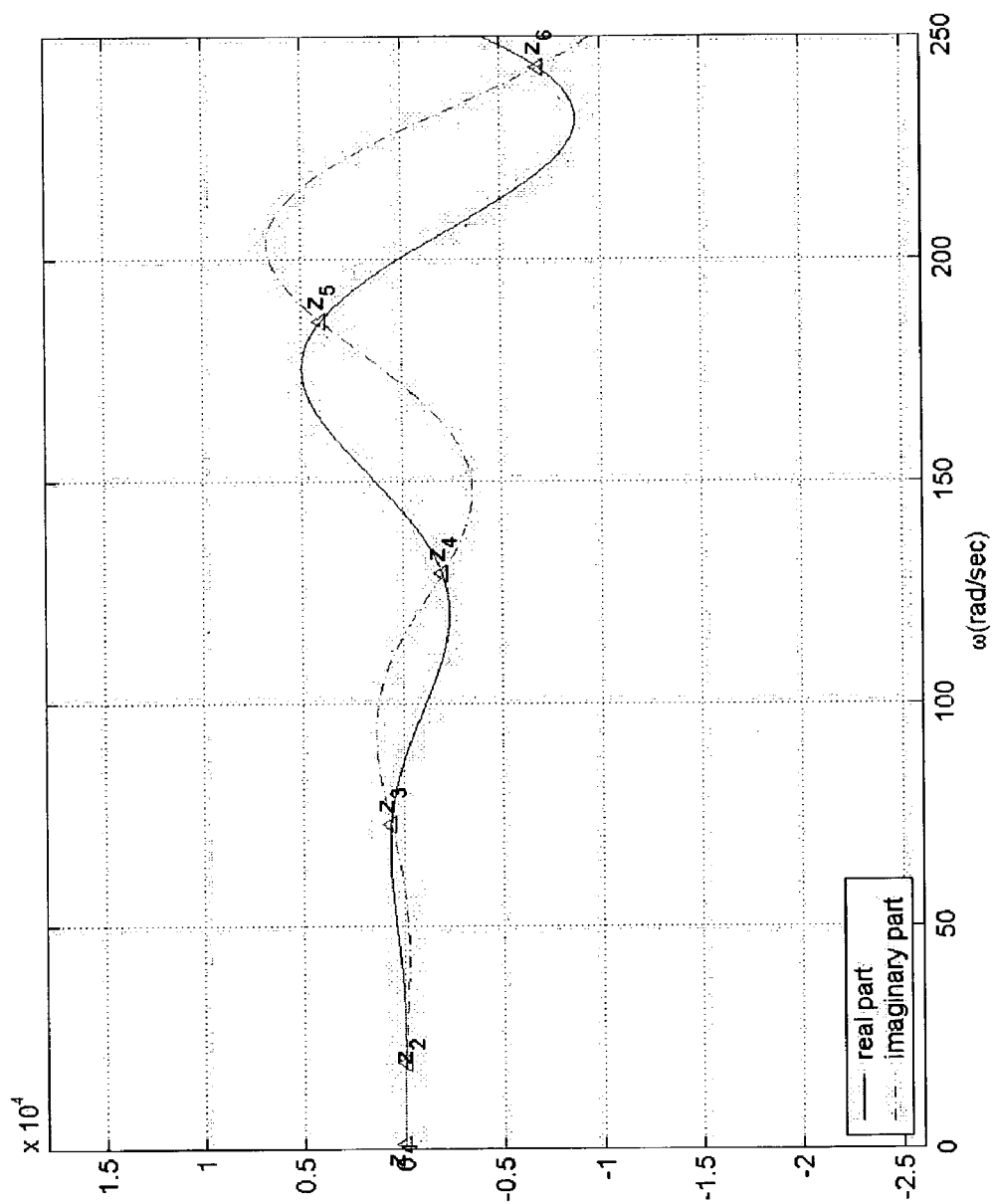
FIG. 6 is a plot of an example of the real and imaginary parts of F*(jω) according to an example embodiment of the invention.

FIG. 6 shows the plot of the real and imaginary parts of $F^*(j\omega)$. It can be observed that the real and imaginary parts interlace.

Figure 7:
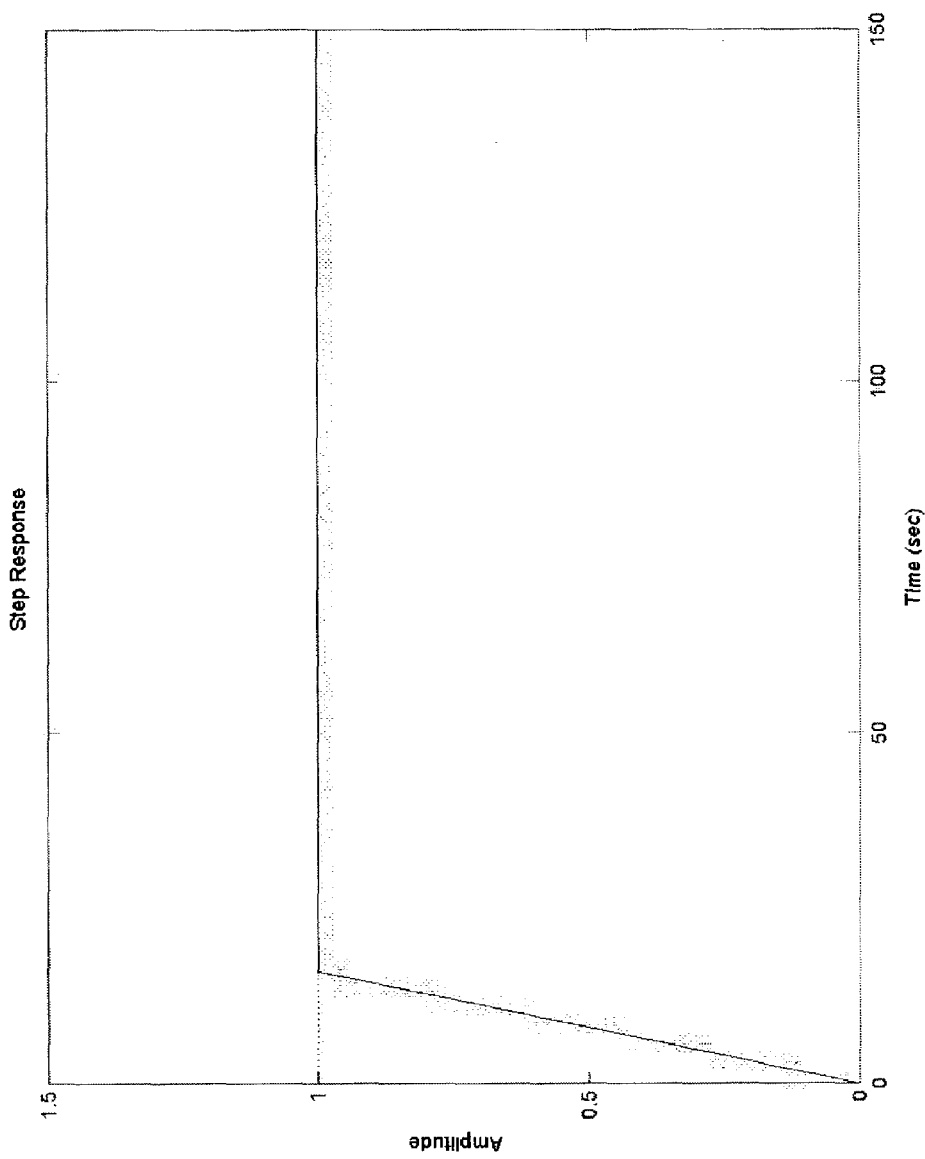
FIG. 7 is a plot of the step response of an example Integral Controller according to FIG. 6.

Further, it is possible to plot the resultant step response of the closed-loop TCP/AQM system as shown in FIG. 7. It can be seen from this figure that the closed-loop system is stable and the system output $R(t)$ tracks the step input signal $T(t)$.

Choosing which gain is most appropriate for a given system is a decision of the system engineer. Increased integral controller gain improves the steady-state error and provides robustness with respect to parameter variations, but high gains may destabilize the system. Having available a range over which all gains are stable provides the advantage to the system engineer of being able to emphasize whichever aspect of controller performance is most desired, while at the same time ensuring that the system performance remains within bounds.

Once the stabilizing integral controller gains have been determined (based upon a TCP/AQM model using small nominal packet size e.g. 64 byte packets), the integral control algorithm can easily be constructed. The integral controller output (19) is given in the s-domain as $$P_i(s) = C_i(s) \cdot E(s) = \frac{k_1}{s} \cdot E(s).$$

where $E(s)$ is the Laplace transform of the control error $e(t)=T-R(t)$.

Denoting $t_m$, $m=1,2,3,\ldots$ as the sampling instants (i.e., the times the controller reads the input values), then in the continuous-time domain, the controller output is given as $$p_i(t) = k_i \int_0^t e(h) \, dh$$

It follows that $$\frac{d p_i(t)}{dt} = k_i e(t).$$

If this derivative is approximated by the backward difference, the following discrete-time approximation may be obtained $$\frac{p_i(t_m) - p_i(t_{m-1})}{\Delta t} = k_i e(t_m),$$

where $\Delta t = t_m - t_{m-1}$, $m=1, 2, 3, \ldots$, is the sampling interval.

This leads to the following recursive equation for the I-controller $$p_i(t_m) = p_i(t_{m-1}) + k_i \Delta t \, e(t_m).$$

Figure 8:
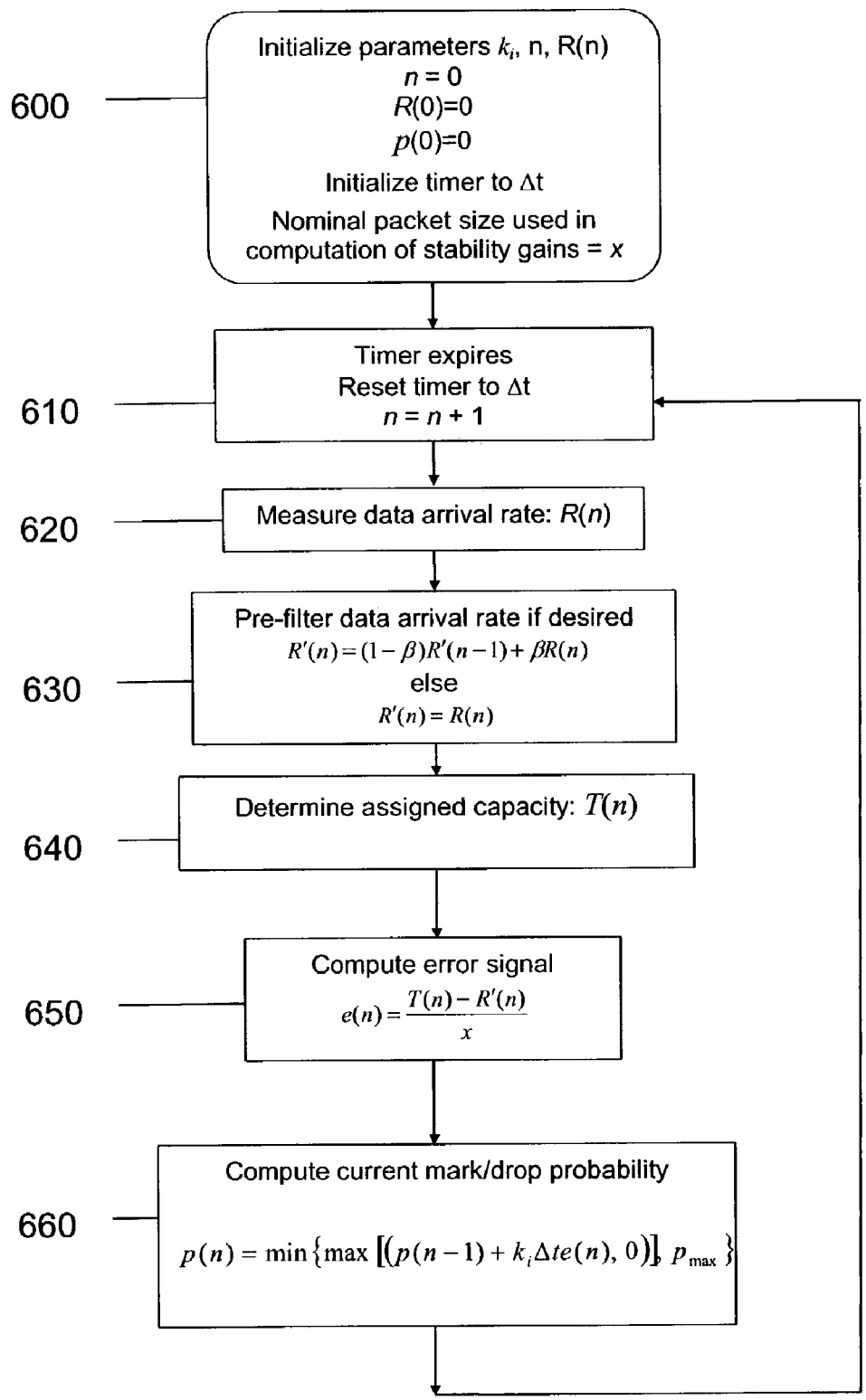
FIG. 8 is a block diagram of a mark/drop probability computation routine according to an embodiment of the invention.
Figure 9:
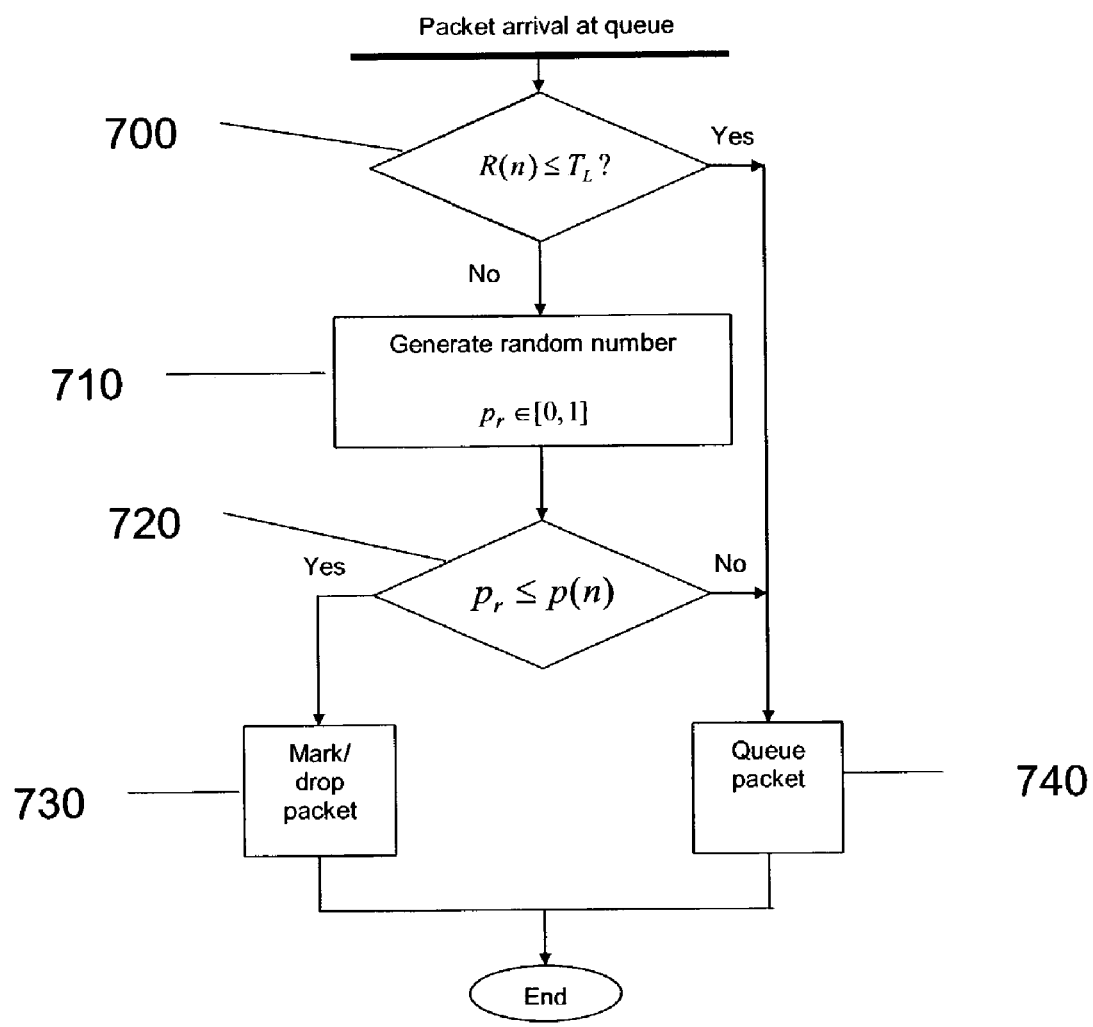
FIG. 9 is a block diagram of a packet drop/mark routine according to an embodiment of the invention.

A flow chart for the control algorithm and the packet mark/drop routine are shown in FIG. 8 and FIG. 9. In the figures, the discrete sampling instants are simply represented as $n=0\Delta t, 1\Delta t, 2\Delta t, 3\Delta t, \ldots$ Note that no packet marking/dropping takes place when $R(t) \leq T_L$ in FIG. 9. The parameter $T_L$ rate threshold is simply a threshold lower than or equal to the control target T during which no packets are marked/dropped even though the mark/drop probability $p(t)$ can be greater than zero. This simple mechanism helps to further minimize oscillations in link utilization and keep the utilization around the control target. Given that the models used in the design of the control system are approximations of the real TCP/AQM plant (i.e., neglect TCP slow start, timeouts), additional mechanisms may be useful to enhance the performance.

It is also important to note that rate measurements are usually noisy and as a result will require some low pass filtering. A simple exponentially weighted moving average (EWMA) filter, for example, can be used for this. The EWMA filter can be expressed as $$\hat{R}(t_m) = (1-\beta)\hat{R}(t_{m-1}) + \beta R(t_m), 0 < \beta < 1.$$

As shown in FIG. 8 the process initiates, at step 600, at discrete time $n=0$, by initializing certain parameters. The timer is set to $\Delta t$ time units, and mark/drop probability $p(0)$, and Rate signal $R(0)$ are set to initial values. The initial mark/drop probability is used in the mark/drop routine until further samples are available. A nominal packet size of x is also chosen at step 600. At step 610, the timer is reset to $\Delta t$ time units to advance to the next discrete time interval. Then at step 620 the data arrival rate R is measured.

At step 630 there is an optional step of pre-filtering the data arrival rate as described previously.

At step 640 the assigned capacity is determined. Typically this is a given for a particular network configuration, but may vary as circumstances warrant, for example if the network is modified.

At step 650 an error signal $e(n)$ is calculated as the difference between the assigned capacity and the measured (and possibly filtered) data arrival rate The error signal is normalized by the nominal packet size x so that the measurements R and T will be consistent with the packet size x used in the computations of the stability gain.

At step 660, a current mark/drop probability $p(n)$ is calculated as per an integral controller using the stable gain $k_i$ established at step 600.

The mark/drop probability calculated at step 660 may be used as the mark/drop probability until the next measurement time as tracked by the timer, at which point a new mark/drop probability will be calculated. In addition, the filtered arrival rate $R'(n)$ if filtering is used, is stored to be used at the next measurement time.

The process may then loop back to step 610 upon timer expiration for another iteration of the process.

FIG. 9 presents a flowchart of a random number generator mark/drop routine. The decision to accept or mark/drop an incoming packet in the routine is based upon the outcome of a comparison of a randomly generated number $P_r \in [0,1]$ and the mark/drop probability $p(n)$. The procedure can be described as follows.

Upon a packet arrival at the queue, at step 700 a determination is made whether the arrival rate is less than or equal to a no-mark/drop rate threshold. If the rate is less than or equal to the rate threshold, then the incoming packet is queued at step 740. If the rate is not less than or equal the rate threshold, then the routine moves to step 710 where a random number $p_r \in [0,1]$ is generated. At step 720 a determination of whether the random number $p_r$ is less than or equal to the calculated mark/drop probability $p(n)$ is made.

If the probability $p_r$ is less than or equal, then the packet is marked/dropped at step 730. If not, the packet is queued at step 740.

Figure 10:
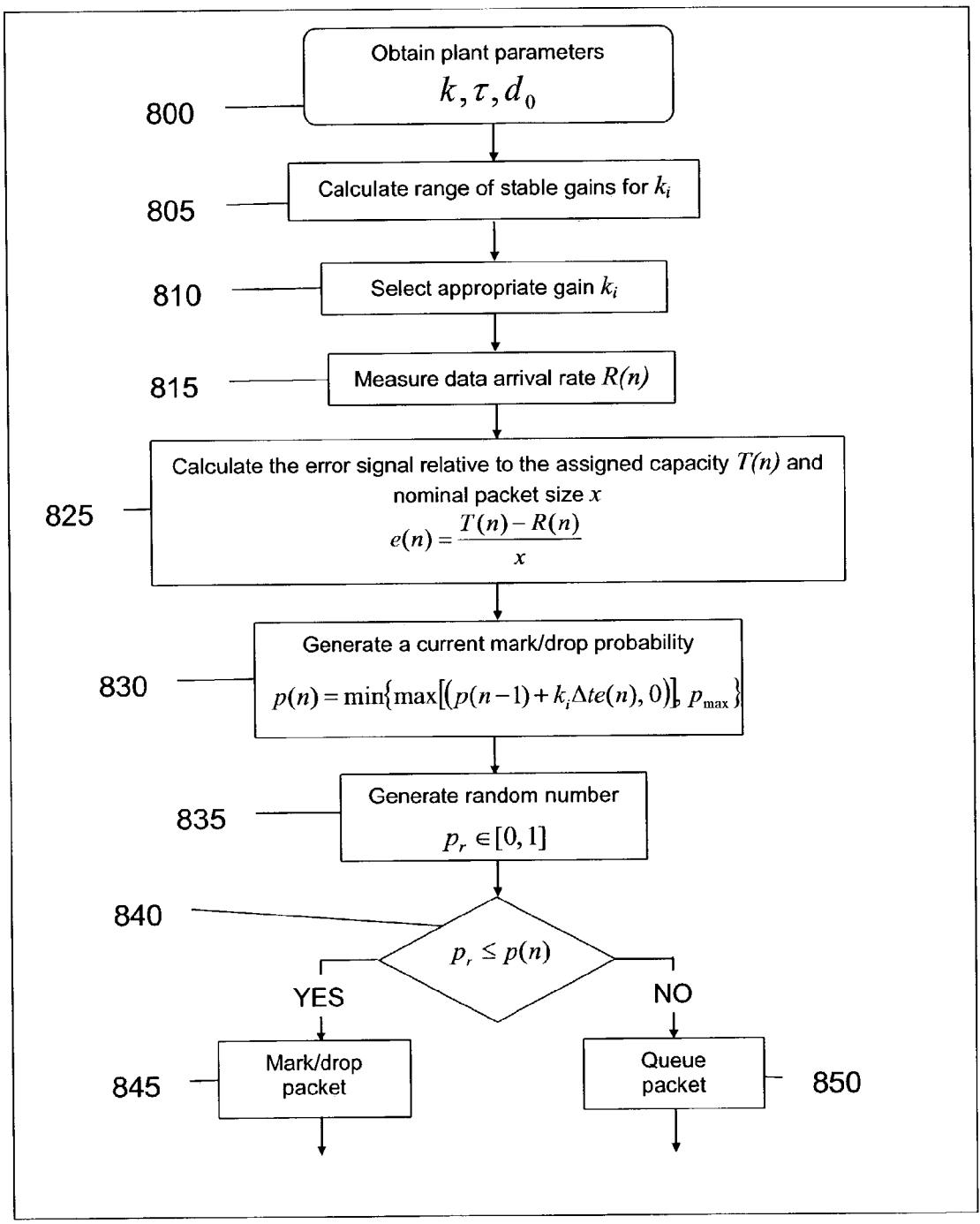
FIG. 10 is a block diagram of an overall control routine according to an embodiment of the invention.

FIG. 10 provides a high-level description of the overall integral control scheme according to an embodiment of the invention. At module 800 TCP/AQM parameters representative of the specific data network to be controlled are obtained. At module 805 these parameters are used to calculate a regime of stable gains for integral gain $k_i$ for an integral controller. At module 810 a particular gain is selected from the regime calculated in the previous step. At module 825, an ongoing mark/drop probability calculation occurs, using the previously selected gain from module 810, and using a measured data arrival rate from module 815 and an assigned capacity T(n) and nominal packet size x. At module 830 a current mark/drop probability is calculated. The module 835 generates a random number in the range [0,1]. Module 840 utilizes the current mark/drop probability p(n) calculated by module 830, and the random number calculated by module 835 to make a determination to mark/drop or queue an incoming packet.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for controlling a data flow in a data network, the method comprising:

selecting a stable integral controller gain $k_i$ for said data network;

measuring a data arrival rate R(n) at time n;

calculating a normalized error signal e(n), according to the relation $e(n)=(T(n)-R(n))/x$, where T(n) is an assigned capacity at time n, and x is a nominal packet size;

computing a mark/drop probability p(n) according to the relation $p(n)=\min\{\max[p(n-1)+k_i\cdot\Delta t\cdot e(n),0],p_{max}\}$ where $\Delta t$ is the time interval between a $(n-1)^{th}$ and the $n^{th}$ computation, and $0<p_{max}\leq 1$; and executing a packet mark/drop routine based upon the calculated mark/drop probability p(n).

2. The method of claim 1 wherein the step of selecting a stable integral controller gain $k_i$ for said data network is preceded by the step of:

pre-calculating a range within which all gains $k_i$ result in a stable gain.

3. The method of claim 2 wherein the step of pre-calculating a range within which all gains $k_i$ result in a stable gain for said data network, is determined according to the method of:

obtaining for said network a value for said network a set of parameters k, $d_{0i}$ and $\tau$, where k is a steady-state gain of said network, $d_0$ is a time delay of said network, and $\tau$ is a time constant of said network;

determining a $z_1$ in the interval $\left(0, \frac{\pi}{2}\right)$ satisfying $\cot(z_1) = \frac{\tau}{d_0}z_1$;

and computing a range of stable gains $k_i$ for said data network according to $-\frac{\tau}{kd_0^2}z_1\sqrt{z_1^2 + \frac{d_0^2}{\tau^2}} < k_i < 0$.

4. The method of claim 1 wherein the step of measuring a data arrival rate R(n) at time n further comprises:

filtering the data arrival rate R(n) according to the relation:

$R'(n)=(1-\beta)\cdot R'(n-1)+\beta R(n)$ where $\beta$ is a filter gain parameter such that $0<\beta<1$, R'(n−1) is the filtered data arrival rate at time n−1, and R'(n) is the desired filtered data arrival rate at time n.

5. The method of claim 1 further comprising a step, preceding the step of executing a packet mark/drop routine, of:

testing the data arrival rate R(n) against a rate threshold $T_L$; and if the data arrival rate R(n) is below or equal to the rate threshold $T_L$ then bypassing the step of executing a packet mark/drop routine.

6. The method of claim 1 wherein the step of executing a packet mark/drop routine further comprises:

marking/dropping packets according to a random number generator mark/drop scheme.

7. An apparatus for controlling a data flow in a data network, said apparatus configured according to the method of any of claims 1-6.

8. An apparatus for controlling a data flow in a data network, the apparatus comprising:

a integral controller having a integral controller gain $k_i$ setting for which the said network is stable;

a data arrival rate measurer for measuring data arrival rate R(n) at time n;

an error signal calculator for calculating a normalized error signal e(n), according to the relation $e(n)=(T(n)-R(n))/x$, where T(n) is an assigned capacity at time n, and x is a nominal packet size;

a mark/drop probability processor for computing a mark/drop probability p(n), according to the relation $p(n)=\min\{\max[p(n-1)+k_i\cdot\Delta t\cdot e(n),0],p_{max}\}$ where $\Delta t$ is the time interval between a $(n-1)^{th}$ and the $n^{th}$ computation, and $0<p_{max}\leq 1$; and a packet mark/drop module for executing a packet mark/drop routine based upon the calculated mark/drop probability p(n).

9. The apparatus of claim 8 wherein the integral controller gain $k_i$ setting for which the said network is stable is chosen from a pre-calculated range within which all gains $k_i$ are gains for which said network is stable.

10. The apparatus of claim 9 wherein the pre-calculated range within which all gains $k_i$ are gains for which said network is stable, is determined according to the method of:

obtaining for said network a value for said network of a set of parameters k, $d_0$, and $\tau$, where k is a steady-state gain of said network, $d_0$ is a time delay of said network, and $\tau$ is a time constant of said network;

determining a $z_1$ in the interval $$\left(0, \frac{\pi}{2}\right)$$

satisfying $$\cot(z_1) = \frac{\tau}{d_0} z_1;$$

and computing a range of stable gains $k_i$ for said data network according to $$-\frac{\tau}{k d_0^2} z_1 \sqrt{z_1^2 + \frac{d_0^2}{\tau^2}} < k_i < 0.$$

11. The apparatus of claim 8 wherein the data arrival rate measurer for measuring data arrival rate R(n) at time n further comprises:

a filter for filtering the data arrival rate R(n) according to the relation:

$R'(n) = (1-\beta) \cdot R'(n-1) + \beta \cdot R(n)$ where $\beta$ is a filter gain parameter such that $0 < \beta < 1$, $R'(n-1)$ is the filtered data arrival rate at time n−1, and $R'(n)$ is the desired filtered data arrival rate at time n.

12. The apparatus of claim 8 further comprising:

a test module for testing the data arrival rate R(n) against a rate threshold $T_L$; and if the data arrival rate R(n) is below or equal to the rate threshold $T_L$ then bypassing the packet mark/drop module.

13. The apparatus of claim 8 wherein the packet mark/drop module further comprises:

a random number generator drop scheme module.

14. A method of determining for a integral controller controlling the flow of data for a data network, a range within which all gains $k_i$ result in a stable gain for said data network, comprising the steps of:

obtaining for said data network a set of parameters k, $d_0$, and $\tau$, where k is a steady-state gain of said network, $d_0$ is a time delay of said network, and $\tau$ is a time constant of said network;

determining a $z_1$ in the interval $$\left(0, \frac{\pi}{2}\right)$$

satisfying $$\cot(z_1) = \frac{\tau}{d_0} z_1;$$

and computing a range of stable gains $k_i$ for said data network according to $$-\frac{\tau}{k d_0^2} z_1 \sqrt{z_1^2 + \frac{d_0^2}{\tau^2}} < k_i < 0.$$

15. An article of manufacture carrying instructions for controlling a data flow in a data network, said instructions including:

instructions for selecting a stable gain of a integral controller gain $k_i$ for said data network;

instructions for measuring a data arrival rate R(n) at time n;

instructions for calculating a normalized error signal e(n), according to the relation $e(n) = (T(n) - R(n))/x$, where T(n) is an assigned capacity at time n, and x is a nominal packet size;

instructions for computing a mark/drop probability p(n) according to the relation $p(n) = \min \{ \max [p(n-1) + k_i \cdot \Delta t \cdot e(n), 0], p_{max} \}$ where $\Delta t$ is the time interval between a $(n-1)^{th}$ and the $n^{th}$ computation, and $0 < p_{max} \leq 1$; and instructions for executing a packet mark/drop routine based upon the calculated mark/drop probability p(n).

* * * * *